United States Patent [19]
Yueh

[11] 3,879,317
[45] Apr. 22, 1975

[54] POLYMER SOLS INCLUDING NUCLEOPROTEIN AND CARBOXYVINYL POLYMER
[75] Inventor: Mao H. Yueh, Minneapolis, Minn.
[73] Assignee: General Mills Chemicals, Inc.
[22] Filed: Jan. 10, 1974
[21] Appl. No.: 433,022

[52] U.S. Cl. .................. 260/8; 424/59; 424/70; 424/71; 424/81; 424/177
[51] Int. Cl. .............................................. C08h 7/00
[58] Field of Search .................................. 260/8

[56] References Cited
UNITED STATES PATENTS
2,305,356  12/1942  Luckenbach .................. 424/81
3,689,419  9/1972  Yueh .................. 424/177

OTHER PUBLICATIONS
Chem. Absts., Vol. 75:121293e, "Excipients for Cosmetics–Acids," Rossi, et al.

Primary Examiner—Morris Liebman
Assistant Examiner—Edward Woodberry
Attorney, Agent, or Firm—Anthony A. Juettner; Norman P. Friederichs; Patrick J. Span

[57] ABSTRACT

Disclosed is a nucleoprotein sol prepared by treating deoxyribonucleoprotein with water soluble carboxyvinyl polymer.

11 Claims, No Drawings

3,879,317

POLYMER SOLS INCLUDING NUCLEOPROTEIN AND CARBOXYVINYL POLYMER

The present invention relates to nucleoprotein and more particularly to solubilization of deoxyribonucleoprotein.

Viscous nucleoprotein sols prepared from deoxyribonucleoprotein are known. In the past such nucleoprotein material has been solubilized using soaps, inorganic salts, anionic detergents and amphoteric detergents. Recently I discovered that the resulting sols are useful in shampoo, hair wave setting compositions, skin conditioners and waste treatment compositions. Although such sols were highly functional in such uses, certain inherent disadvantages were present. For example, in certain uses it is desirable to avoid use of salts or detergents, typically, in hair wave setting compositions and skin conditioners. The known sols at certain concentrations also possessed a characteristic described as elasticity or stringiness. In other words the solution generally was not easily separated into discrete portions. If one attempted to pour a small portion from a container, the stream leaving the container would not separate easily from the portion in the container, but rather would be pulled back into the container much like a piece of rubber band contracting. The present invention overcomes such disadvantages by using carboxyvinyl polymer (i.e., carboxypolymethylene) to solubilize the deoxyribonucleoprotein. The resulting sol has a desirable consistency and is of particular value in uses such as skin conditioners and hair wave setting compositions since salts and detergents need not be present.

The sol of the present invention may include at least 0.01 percent, typically, 0.01 to 2.0 percent deoxyribonucleoprotein, at least 0.01 percent, typically, 0.01 to 1.0 percent carboxyvinyl polymer; and at least 80 percent, typically, 80 to 99 percent water. Various other materials may be present such as compatible perfumes and coloring.

The nucleoprotein material used in the present invention may be of the same types as previously used in preparing viscous sols. The term nucleoprotein as used herein will refer to deoxyribonucleoprotein. For example, it may be obtained from any substance having a substantial amount of deoxyribonucleoprotein present, preferably fish milt or avian blood. Other sources would include wheat germ, microbial material and various organ tissue such as thymus, spleen, pancreas and liver obtained from calves or testes obtained from bulls. For purposes of economics and ease in preparation, the substance should have at least 0.5 percent deoxyribonucleoprotein by weight. As used herein, the term "nucleoprotein material" will mean a material containing at least 0.5 percent deoxyribonucleoprotein.

The nucleoprotein material may be treated in various ways for purposes of stabilization, purification and concentration. The material may be heated and/or treated with a lower aliphatic alcohol to inactivate enzymes. The material may be treated to remove cell walls and tissue, for example, by blending the material to obtain uniform size and homogeneity such as in a blender or mixer. The material may be concentrated or dehydrated by conventional techniques such as vacuum, drum, tray, freeze drying and the like.

Fish milt is the most highly preferred source of the nucleoprotein. Fish milt is one of the waste products of the fish processing industry. It is made up primarily of the fish sperm surrounded by connective tissue. Analysis of the milt shows that it contains large amounts - i.e., 90 percent and more - of deoxyribonucleoprotein wherein the protein is protamine. Normally the milt is combined with other fish wastes and utilized to some extent as a hatchery feed. Some biochemical companies use the milt as a raw material for the preparation of DNA (deoxyribonucleic acid). More often than not, the milt is simply disposed of with the rest of the fish waste products.

Highly useful viscous sols can be prepared by dispersing the fish milt solids in an aqueous medium along with carboxyvinyl polymer. The carboxyvinyl polymer appears to at least partially solubilize the otherwise insoluble milt solids. In so doing, it is theorized that the deoxyribonucleoprotein of the milt unwinds and swells, thus forming the viscous sol. The mixture of water, carboxyvinyl polymer and deoxyribonucleoprotein is stable, that is, it does not separate into its component parts. Also the mixture in some instances may be clear or nearly clear. If desired, one may add a material to provide opaqueness such as silica.

The invention is applicable to fresh milt solids as well as milt that has been processed in various ways to inhibit enzyme activity or deterioration. Thus, fresh milt, such as salmon milt available, for example, from Alaskan canneries, can be merely reduced in particle size such as by blending or homogenizing, and then dispersed in water or other suitable aqueous medium which contains, or to which is added, the water soluble carboxyvinyl polymer. However, it is preferred to further process the milt prior to use in the present invention since it deteriorates rather quickly. Additionally, it is desirable to reduce or eliminate any "fishy" smell that the milt may possess. Also, it has been found that fresh milt can be preserved by adding small quantities of the sodium salt of ethylene diamine tetracetic acid, sodium arsenate and/or 5-nitrofurfuralsemicarbazone. The use of small quantities of each of these materials is preferred. The fresh milt solids or dry milt solids can also be frozen and then thawed immediately prior to use in preparing the sol.

The milt can be heated to effect at least partial enzyme deactivation. Where the heating temperatures are high - i.e., 90°C. or above - the treatment times should be short. For example, if the heating temperature is between 106° and 116°C., the time may be about 2 to 4 seconds. Where the heating temperatures are below about 90°C. - i.e. about 50° to 90°C. - the treatment can be carried out for from a few minutes to an hour or more - i.e., about 5 minutes to two hours. It has been found that the above heat treatments are effective in extending the useful life of the milt solids and of the resulting viscous sols. However, care must be exercised to prevent the denaturization of the milt solids - i.e., the deoxyribonucleoproteins. Additionally, the heat treatment does not ordinarily completely deactivate the enzymes. Thus, the milt solids and resulting viscous solids are still subject to deterioration after reasonable storage periods. It is especially preferred to treat the milt solids with a lower aliphatic alcohol of 1 to about 5 carbon atoms. Especially preferred alcohols are methanol, ethanol and isopropanol. The milt solids can be dispersed in alcohol and then recovered. It is preferred to use from about 2 to about 30 volumes of the alcohol based on the volume of the milt solids. From an economic standpoint, the use of about 2 to about 10 volumes is especially preferred. The alcohol may be cold or heated to as high as its boiling point in the case of methanol, ethanol and isopropanol, or to about 90°C. in the case of the alcohols having boiling points above such temperature.

The milt, fresh or preserved with chemical additives as aforementioned, can be dehydrated by conventional techniques - i.e., vacuum, drum, tray, freeze drying and the like. Where the enzymes have been partially or completely inactivated, as above described, the dry milt solids can be stored for various periods of time prior to use in the present invention.

The viscous sols are then prepared by dispersing the milt solids in an aqueous medium which contains, or to which is added, the carboxyvinyl polymer. The carboxyvinyl polymer may be present in an amount of at least about 0.01 percent by weight based on the total weight of the sol. The overall preferred range is about 0.01 to 1.0 percent. Carboxyvinyl polymers are polymers which contain a vinyl group and a carboxyl group. Illustrative of such polymers are the homo and copolymers of acrylic acid. Acrylic acid has the formula $CH_2=CH-CO_2H$ and thus possesses a vinyl group and carboxyl group. Where copolymers of acrylic acid are employed it is preferable that the polyacrylic acid or acrylate comprise at least 90 percent and, more preferably, at least 95 percent by weight of the polymer. Illustrative of the comonomer employed with acrylic acid to form copolymers are allyl compounds such as allyl starch or sucrose. In general, any copolymer of polyacrylic acid having substantially the same infra red absorption spectra as the polyacrylic acid homopolymer is suitable for use in the present invention.

The carboxyvinyl polymers are commercially available. Illustrative of such polymers are those supplied by B. F. Goodrich such as WS-801 which is a polyacrylic acid polymer having a molecular weight of approximately 250,000 and various Carbopol products (i.e., Carbopol 934, 940 and 941) which have varying molecular weights above 250,000. Carbopol 934 has the same infra red scan as WS-801 (polyacrylic acid) and an equivalent weight of near 75. Carbopol 960 and 961 are the corresponding ammonium salts of Carbopol 934 and 941, respectively. Carbopol 934, for example, is a copolymer of about 100 parts of acrylic acid and about 1 to 2 parts of octa-allyl sucrose. The carboxyvinyl polymer is in a water soluble form for use in the present invention. The carboxyvinyl polymer may be obtained commercially in the water soluble form, typically, Carbopol 960. Alternatively, the carboxyvinyl polymer, such as Carbopol 934, may be solubilized by treatment with an alkaline material to raise the pH to about pH 7.0. The alkaline material is preferably an alkali metal hydroxide such as sodium hydroxide and potassium hydroxide or an organic base such as triethanolamine, monoethanolamine and the like. Care must be exercised to avoid changing the pH so drastically as to denature the deoxyribonucleoprotein (i.e., separate into protein and deoxyribonucleic acid). The carboxyvinyl polymer may be made water soluble by adjusting the pH of the carboxyvinyl polymer to at least pH 5.5. The pH may be maintained in the range of 7.0 to 9.0.

The aqueous medium is preferably plain water. However, it is to be recognized that the water may contain various other materials, for example, those commonly found in hair wave setting compositions and skin conditioners, such as perfume. Of course, such materials must not be of a type that would destroy the functionality of the nucleoprotein such as by denaturization.

The deoxyribonucleoprotein is dispersed in the aqueous medium in an amount sufficient to yield the viscous sol. Surprisingly, even very small amounts of the deoxyribonucleoprotein will yield sols of good viscosity and functionality. The nucleoprotein typically will be present in an amount of at least 0.01 percent, by weight, based on the total weight of the sol. For example, in this regard, 0.1 percent by weight of the milt solids yields hair setting compositions or skin conditioners with excellent properties. Thus, such amount is especially preferred for such uses. The overall preferred range of nucleoprotein in the sol is from about 0.01 to 2.0 percent by weight based on the total weight of the particular composition (e.g., hair setting compositions).

The nucleoprotein material used in the present invention may be obtained from avian blood erythrocytes. Avian blood is blood obtained from birds. The avian blood used in the present invention may be obtained from any type of bird; however, preferred birds include chickens, ducks, turkeys and other domestic birds. The avian blood erythrocytes may be processed in various ways, such as to increase the concentration of deoxyribonucleoprotein and correspondingly reduce color. This procedure is carried out by hemolyzing the erythrocytes, thus releasing the hemoglobin. Various hemolyzing agents may be employed to rupture the cell walls of the erythrocytes. A preferred such agent is saponin which can be employed in low concentrations - i.e., from about 0.01 to 1.9 percent by weight based on the dry weight of the erythrocytes. After hemolysis is completed, the solids may be washed, preferably with water of dilute aqueous NaCl solutions to remove the soluble materials and especially the hemoglobin. The erythrocytes per se or any fraction thereof may also be treated with a lower aliphatic alcohol of from 1 to about 5 carbon atoms. Such treatment tends to deactivate enzymes and other microorganisms, thus preventing deterioration. Additionally, the blood from which the erythrocytes can be treated with sodium citrate to prevent clotting and thus facilitate the separation of the erythrocytes from the plasma. The erythrocytes, or fractions thereof, can be dehydrated by conventional techniques - i.e., vacuum, drum, tray, freeze drying and the like.

The viscous sols are then prepared by dispersing the erythrocytes or described fraction of erythrocytes in an aqueous medium which contains or to which is added the carboxyvinyl polymer. The nucleoprotein may be used in the same amounts as described with respect to the fish milt. The carboxyvinyl polymer may be used in the same amounts as mentioned with respect to fish milt.

The nucleoprotein material of the present invention, typically, may be a microorganism such as *Xanthomonas campestris* NRRL-B1459, *Xanthomonas campestris* var. *alfalfae* ATCC 11765, *Agrobacterium tumefaciens* NRRL-836, *Escherichia coli* ATCC 11775, *Alcaligenes faecalis* ATCC 337, *Bacilus subtilis* var. natto ATCC 7058, *Erwinia cartovoria* ATCC 15713, *Bacillus cereus* ATCC 10987, *Escherichia coli* strep. resistant ATCC 25250, *Micrococus citreus* ATCC 10987, *Proteus vulgaris* ATCC 13315, *Pseudomonas aeroginosa* ATCC 10145, *Sarcina lutia* ATCC 10054, *Serratia marcesceus* ATCC 13880, and the like. The microorganisms may be fresh and are preferably separated from their growing medium such as by centrifugation. The microorganisms may be frozen prior to use.

The viscous sols are prepared by dispersing the microbial material in an aqueous medium which contains or to which is added carboxyvinyl polymer of the same types and amounts as mentioned with respect to fish milt. The microbial material may be included in the viscous sol in amounts as described with respect to the fish milt nucleoprotein, for example, at least 0.01 to 2.0 percent by weight based on the total weight of the aqueous medium.

Other nucleoprotein containing material may be used in the present invention, typically including wheat germ and organ tissue such as thymus, spleen, pancreas, liver and testes. The organ tissue may be treated much as described with respect to milt, blood and microbials for purposes of stabilizing and/or concentrating the nucleoprotein material. For example, skin and connective tissue may be removed. The tissue may be finely cut or chopped so that it can be easily and thoroughly dispersed in the aqueous medium. The tissue may be dried using alcohols such as methanol, ethanol or isopropanol. Of course, any undissolved residue remaining after formation of the sol preferably is removed.

The following examples serve to illustrate the present invention and are not intended for purposes of limitation.

EXAMPLE A

Fresh, frozen salmon milt was thawed and chopped into small fragments. The milt was passed through a meat grinder and the resulting mince was rapidly dispersed in 10 volumes of isopropanol and stirred continuously for 1 hour. The solids were filtered, dried and ball milled in a 4°C. room. A creamy white and fine powdery product was obtained. The product was suitable for use in forming the sol of the present invention.

EXAMPLE B

About 100 milliliters of turkey blood (containing about 0.2 percent by weight heparin to prevent clotting) was centrifuged at 40°F. and 2,000 rpm for 20 minutes. The blood was separated into the supernatant (plasma) and a precipitate of 49.0 milliliters (mainly erythrocytes). The precipitate, composed of 69.8 percent moisture and 30.4 percent solids, was dispersed in five volumes of ethanol and stirred continuously at room temperature for 30 minutes. After filtration, air drying and grinding, a dark powdery product was obtained. The product was suitable for use in the present invention.

EXAMPLE C

Seventy milliliters of fresh turkey blood (containing about 3.0 percent by weight sodium citrate to prevent clotting) was centrifuged at 4°C. and 10,000 rpm for ten minutes to remove the serum proteins. The residue which contained the erythrocytes was washed three times with about 100 milliliters of 0.9 percent by weight aqueous NaCl solution, each washing being followed by centrifugation to recover the precipitate. Then the precipitate was dispersed in 10 volumes of the salt solution to which was also added 0.6 percent by weight saponin. After standing at 4°C. for 30 minutes, the mixture was centrifuged at 12–14,000 rpm for 30 minutes to remove the dark supernatant. The residue was washed three times with 50 volumes of cold (4°C.) 0.9 percent aqueous NaCl and recovered each time by centrifugation. The final washing and centrifugation resulted in a lightly pinkish supernatant and a creamy residue. The residue was recovered and dispersed in 50 milliliters of ethanol. After filtration and air drying, a white powdery nucleoprotein product was obtained. The product was suitable for use in the present invention.

EXAMPLE D

Microorganisms of the type *Xanthomonas campestris* NRRL-B1459 were obtained from a commercial source. The microorganisms were inoculated in 100 milliliters of culture medium contained in a 500 milliliter Erlenmeyer flask. The culture medium was composed of 2.0 percent cerelose, 0.5 percent yeast extract, 0.5 percent trypton, 0.5 percent $KH_2PO_4$ and 96.4 percent water, by weight. The medium, prior to inoculation, was adjusted to pH 7.0 and sterilized. Incubation was carried out on a rotary shaker at 25°C. for 42 hours. The shaker rotated in a 2 inch diameter circle at 250 rpm. The cells were then recovered from the medium by centrifugation for 10 minutes at 9,500 rpm. The recovered material was a yellow pasty mass having a moisture content of about 80 percent by weight. The product was suitable for use in the present invention.

EXAMPLE I

A sol was prepared according to the present invention by dispersing 100 milligrams of carboxyvinyl polymer (Carbopol 934) in 50 milliliters of water. Then 0.3 milliliters of 2 normal sodium hydroxide were added with stirring to obtain a clear gel. One hundred milligrams of the salmon nucleoprotein product of Example A were dispersed in 50 milliliters of water. The nucleoprotein product was added to the clear gel. The mixture was stirred for a few minutes and the nucleoprotein material became solubilized producing a smooth sol.

EXAMPLE II

Example I was repeated except using 500 milligrams of carboxyvinyl polymer (Carbopol 934), 1.5 milliliters of 2 normal sodium hydroxide and 100 milligrams of the salmon nucleoprotein. A smooth sol was obtained.

EXAMPLE III

Example I was repeated except using 1000 milligrams of carboxyvinyl polymer (Carbopol 934), 3.0 milliliters of 2 normal sodium hydroxide and 100 milligrams of salmon nucleoprotein. A smooth sol was obtained.

EXAMPLE IV

Examples I–III were repeated except that the sodium hydroxide additions were replaced with 100 milligrams, 500 milligrams, and 1,000 milligrams, respectively, of triethanolamine. Smooth sols were obtained.

EXAMPLE V

A sol was prepared according to the present invention by dispersing 200 milligrams of the turkey blood erythrocytes (treated as described in Example B) in 50 milliliters of water. Two hundred milligrams of carboxyvinyl polymer (Carbopol 934) and 200 milligrams of triethanolamine were mixed with 50 milliliters of water. The two water mixtures were combined and stirred for a few minutes. A homogeneous nucleoprotein sol was obtained.

EXAMPLE VI

A sol was prepared according to the present invention by dispersing 10 milligrams of the treated turkey blood nucleoprotein of Example C in 50 milliliters of water. Two hundred milligrams of carboxyvinyl polymer (Carbopol 934) and 200 milligrams of triethanolamine were mixed with 50 milliliters of water. The two water mixtures were combined and stirred for a few minutes. A homogeneous nucleoprotein sol was obtained.

EXAMPLE VII

A sol was prepared according to the present invention by dispersing 200 milligrams of the treated *Xanthomonas campestris* NRRL-B1459 (dry weight) of Example D in 50 milliliters of water. Two hundred milligrams of carboxyvinyl polymer (Carbopol 934) and 200 milligrams of triethanolamine were mixed with 50 milliliters of water. The two water mixtures were combined and stirred for a few minutes. A homogeneous nucleoprotein sol was obtained.

EXAMPLE VIII

A hair conditioner cream was prepared using the sol of the present invention. 20 parts water and 0.1 parts salmon nucleoprotein of Example A were mixed. 60 parts water, 1.2 parts triethanolamine and 1.0 parts carboxyvinyl polymer were mixed and added to the nucleoprotein-water dispersion. Three parts ethoxylated lanolin alcohol, 5.0 parts lanolin derived sterol and 2.0 parts acetylated lanolin alcohol were mixed, heated to 70°C. and added with stirring to the nucleoprotein-carboxyvinyl polymer solution at 70°C. The resulting mixture was cooled to 30°C. and was added with mixing to a mixture containing 0.05 parts methyl parahydroxybenzoic acid, 0.05 parts propyl parahydroxybenzoic acid and 0.1 part perfume. A smooth and soft, creamy product suitable for use as a hair conditioner was obtained.

EXAMPLE IX

A hand cream was prepared using the sol of the present invention. The hand cream was prepared from the following mixtures:

| | Ingredients | Parts (by wt.) |
|---|---|---|
| Portion A | Ethoxylated lanolin alcohols | 2.0 |
| | Lanolin derived sterol | 5.0 |
| | Acetylated lanolin alcohols | 2.0 |
| | Glycerol monostearate | 2.5 |
| Portion B | Triethanolamine | 1.1 |
| | Glycerine | 3.0 |
| | Water | 29.8 |
| Portion C | Carboxyvinyl polymer (Carbopol 934) | 0.75 |
| | Water | 40.0 |
| Portion D | Nucleoprotein material (from Example A) | 0.1 |
| | Water | 10.0 |
| Portion E | Methyl parahydroxybenzoic acid | 0.1 |
| | Propyl parahydroxybenzoic acid | 0.1 |
| | Perfume | trace |

Portions B and C were thoroughly mixed. Portion D was added to the mixture B-C. The resulting mixture was heated to 72°C. and Portion A, at 72°C., was added and thoroughly mixed. The mixture was cooled to room temperature and Portion E was added with mixing. A soft, creamy product was obtained and used as a hand cream. The product was found to soften and condition the skin.

EXAMPLE X

Example IX was repeated except that 0.4 part of the nucleoprotein material was used. A soft, creamy product was obtained and used as a skin conditioner.

EXAMPLE XI

A suntan cream was prepared using the sol of the present invention. The cream was prepared from the following mixtures:

| | Ingredients | Parts (by wt.) |
|---|---|---|
| Portion A | Carboxyvinyl polymer | 0.5 |
| | Sorbitol | 3.1 |
| | Water | 46.5 |
| | Triethanolamine | 0.8 |
| Portion B | Nucleoprotein material (from Example A) | 0.1 |
| | Water | 20.0 |
| Portion C | Stearic acid | 5.1 |
| | Cetyl alcohol | 0.2 |
| | Amyl-p-dimethyl aminobenzoate | 0.5 |
| | Fatty esters | 2.0 |
| | Lanolin, Anhydrous | 1.7 |
| | Water | 19.2 |
| Portion D | Methyl parahydroxybenzoic acid | 0.1 |
| | Propyl parahydroxybenzoic acid | 0.1 |
| | Perfume | trace |

Portions A and B were mixed and heated to 70°C. Portion C was heated to 70°C. and mixed with the heated mixture of A–B. The resulting mixture was cooled to 30°C. and mixed with Portion D. A soft, creamy product was obtained and found to be satisfactory as a suntan cream.

The embodiments of the invention in which an exclusive property or privilege is claimed are defined as follows:

1. A process for preparing a sol comprising adding deoxyribonucleoprotein and carboxyvinyl polymer in water, said water being present in an amount of at least 80 percent by weight of the sol, said deoxyribonucleoprotein being present in an amount of at least 0.01 percent by weight of the sol, said carboxyvinyl polymer being a member of the group consisting of homopolymers and copolymers of acrylic acid, said carboxyvinyl polymer having a molecular weight of at least about 250,000, said carboxyvinyl polymer being present in a water soluble form having a pH of at least 5.5, said carboxyvinyl polymer being present in an amount of at least 0.01 percent by weight of the sol, said polymer amount being sufficient to form a stable mixture of said water, deoxyribonucleoprotein, and carboxyvinyl polymer.

2. The process of claim 1 wherein the carboxyvinyl polymer is present in an amount of about 0.01 to 1.0 percent by weight of the sol and the deoxyribonucleoprotein is present in an amount of about 0.01 to 2.0 percent by weight of the sol.

3. The process of claim 1 wherein the deoxyribonucleoprotein and the carboxyvinyl polymer are present in about the same amounts by weight.

4. The process of claim 1 wherein the pH is adjusted to about pH 7.

5. The process of claim 1 wherein the pH is adjusted by addition of an alkaline material selected from the group consisting of sodium hydroxide, potassium hydroxide, triethanolamine and monoethanolamine.

6. The process of claim 1 wherein the pH is adjusted by addition of a member selected from the group consisting of alkali metal hydroxides and organic bases.

7. A polymer sol comprising water, deoxyribonucleoprotein and carboxyvinyl polymer; said water being present in an amount of at least about 80 percent, by weight; said deoxyribonucleoprotein being present in an amount of at least about 0.01 percent by weight; and said carboxyvinyl polymer being present in an amount of at least about 0.01 percent by weight, said carboxyvinyl polymer having an infrared spectra absorption substantially identical to polyacrylic acid and a molecular weight of at least about 250,000, said carboxyvinyl polymer having a pH of at least 5.5, said carboxyvinyl polymer being a member of the group consisting of homopolymers and copolymers of acrylic acid.

8. The sol of claim 7 wherein said deoxyribonucleoprotein is present in an amount of from 0.01 to 2.0 percent by weight of the sol and wherein said carboxyvinyl polymer is present in an amount of from 0.01 to 1.0 percent by weight of the sol.

9. The sol of claim 7 wherein the carboxyvinyl polymer has a molecular weight of about 250,000.

10. The sol of claim 9 wherein the carboxyvinyl polymer has an acid equivalent of about 75.

11. The sol of claim 10 wherein the carboxyvinyl polymer is a copolymer of acrylic acid and allyl sucrose.

* * * * *